US012653150B2

(12) United States Patent　　　　(10) Patent No.:　US 12,653,150 B2
Koetter et al.　　　　　　　　　　(45) Date of Patent:　　Jun. 16, 2026

(54) WATER CIRCULATION DEVICE

(71) Applicant: Toasty Float Inc., McCook, NE (US)

(72) Inventors: David Koetter, McCook, NE (US); Benjamin Blecha, Benkelman, NE (US); David Kittle, Charlotte, NC (US); Scott Rendel, Rock Hill, SC (US); Devon Newman, Clinton, UT (US); Mike Lloyd, Riverside, CA (US)

(73) Assignee: Toasty Float Inc., McCook, NE (US)

( * ) Notice: Subject to any disclaimer, the term of this patent is extended or adjusted under 35 U.S.C. 154(b) by 0 days.

(21) Appl. No.: 18/964,798

(22) Filed: Dec. 2, 2024

(65) Prior Publication Data

US 2026/0150811 A1　　Jun. 4, 2026

(51) Int. Cl.
　　*A01K 7/02*　　　　(2006.01)
(52) U.S. Cl.
　　CPC ................................... *A01K 7/027* (2013.01)
(58) Field of Classification Search
　　CPC ... A01K 7/027; B01F 25/104; B01F 25/1041; B01F 25/10; C02F 1/34
　　See application file for complete search history.

(56) References Cited

U.S. PATENT DOCUMENTS 3,855,367 A * 12/1974 Webb ..................... C02F 3/1294
　　　　　　　　　　　　　　　　　405/52
4,053,142 A * 10/1977 Johannes .............. B01F 35/753
　　　　　　　　　　　　　　　　　366/165.1

4,320,720 A 　3/1982 Streed
4,708,091 A 　11/1987 Schafer
4,930,572 A 　6/1990 Doshier
5,098,690 A * 　3/1992 Koves ....................... B05B 1/18
　　　　　　　　　　　　　　　　　239/533.1
5,393,502 A * 　2/1995 Miller ................... B01F 25/104
　　　　　　　　　　　　　　　　　366/136
(Continued)

FOREIGN PATENT DOCUMENTS

CA　　　2713762 A1 * 　8/2009 ............ A61M 15/00
CN　　112352691 A * 　2/2021 ............... A01K 7/02
(Continued)

OTHER PUBLICATIONS

Meet the Water Rippler, https://water-rippler.com/, accessed Jul. 22, 2024.

*Primary Examiner* — Magdalena Topolski
(74) *Attorney, Agent, or Firm* — Taft Stettinius & Hollister LLP

(57)　　　　　　　ABSTRACT

An example water circulation device is configured for mounting within a livestock watering reservoir, and generally includes a mount, a housing, and a nozzle. The mount is configured to facilitate mounting of the water circulation device within the livestock watering reservoir. The housing is coupled to the mount, extends along a longitudinal axis, and includes helical channels and apertures distributed amongst the helical channels. The nozzle is mounted in the housing and configured to discharge water at an oblique angle relative to the longitudinal axis to thereby cause circulation of water within the housing. Moreover, the housing is configured to discharge circulating water via the plurality of apertures in a manner that generates eddy currents in an area of the livestock watering reservoir that is positioned outside of the housing.

24 Claims, 12 Drawing Sheets

(56)                    References Cited

U.S. PATENT DOCUMENTS

| | | | |
|---|---|---|---|
| 6,619,232 B2 | 9/2003 | Johnston et al. | |
| 6,776,121 B2 | 8/2004 | Anderson | |
| 8,041,200 B2 | 10/2011 | Reusche et al. | |
| 8,118,283 B2 * | 2/2012 | Vlasak | B01F 25/10 |
| | | | 261/36.1 |
| 8,176,874 B2 | 5/2012 | Reusche et al. | |
| 8,336,496 B2 | 12/2012 | Reusche et al. | |
| 8,534,576 B2 * | 9/2013 | Grohe | B05B 1/08 |
| | | | 239/423 |
| 10,383,310 B2 | 8/2019 | Wright | |
| 10,532,331 B2 * | 1/2020 | Yang | C02F 7/00 |
| 11,291,184 B2 * | 4/2022 | Nienke | F04D 13/086 |
| 11,582,947 B2 | 2/2023 | Van Otterloo | |
| 11,653,626 B2 | 5/2023 | Smith | |
| 11,944,080 B2 | 4/2024 | Lisk | |
| 12,083,488 B2 * | 9/2024 | Johnson | B01F 35/41 |
| 12,225,890 B2 * | 2/2025 | Otwell | A01K 7/04 |
| 12,356,962 B2 * | 7/2025 | Chamberlain | A01K 7/022 |
| 2007/0267397 A1 | 11/2007 | Reusche et al. | |
| 2015/0152618 A1 | 6/2015 | Bertagnolli | |
| 2021/0076638 A1 | 3/2021 | Chamberlain et al. | |

FOREIGN PATENT DOCUMENTS

| | | | | |
|---|---|---|---|---|
| KR | 200362961 Y1 * | 9/2004 | | F16K 31/02 |
| TW | 452502 B * | 9/2001 | | B01F 25/104 |
| WO | WO-2006121074 A1 * | 11/2006 | | B01F 25/25 |

* cited by examiner

WATER CIRCULATION DEVICE

TECHNICAL FIELD

The present disclosure generally relates to water circulation devices, and more particularly but not exclusively relates to water circulation devices configured to discourage freezing in a livestock watering reservoir via the generation of eddy currents.

BACKGROUND

Livestock are commonly provided with water via a livestock watering reservoir, such as a bin, trough, or other form of reservoir. One difficulty that can arise in watering livestock is the formation of ice in the reservoir. When temperatures are below freezing, the water in the reservoir will begin to freeze, thereby forming a layer of ice on the surface of the water. When the ice becomes sufficiently thick, it can become difficult for the livestock to break the ice barrier to access the water below. One approach to addressing formation of ice involves a person touring the land and breaking the ice manually. However, this approach can be time-consuming and intensive in terms of human capital. Another approach involves the use of heating elements to keep the water from freezing, typically involving the use of electricity and/or fuel to heat the water. However, electricity and fuel can be expensive, and may be unavailable or inaccessible, particularly in outdoor and remote locations. For these reasons among others, there remains a need for further improvements in this technological field.

SUMMARY

An example water circulation device is configured for mounting within a livestock watering reservoir, and generally includes a mount, a housing, and a nozzle. The mount is configured to facilitate mounting of the water circulation device within the livestock watering reservoir. The housing is coupled to the mount, extends along a longitudinal axis, and includes helical channels and apertures distributed amongst the helical channels. The nozzle is mounted in the housing and configured to discharge water at an oblique angle relative to the longitudinal axis to thereby cause circulation of water within the housing. Moreover, the housing is configured to discharge circulating water via the plurality of apertures in a manner that generates eddy currents in an area of the livestock watering reservoir that is positioned outside of the housing. Further embodiments, forms, features, and aspects of the present application shall become apparent from the description and figures provided herewith.

DETAILED DESCRIPTION OF ILLUSTRATIVE EMBODIMENTS

Figure 1:
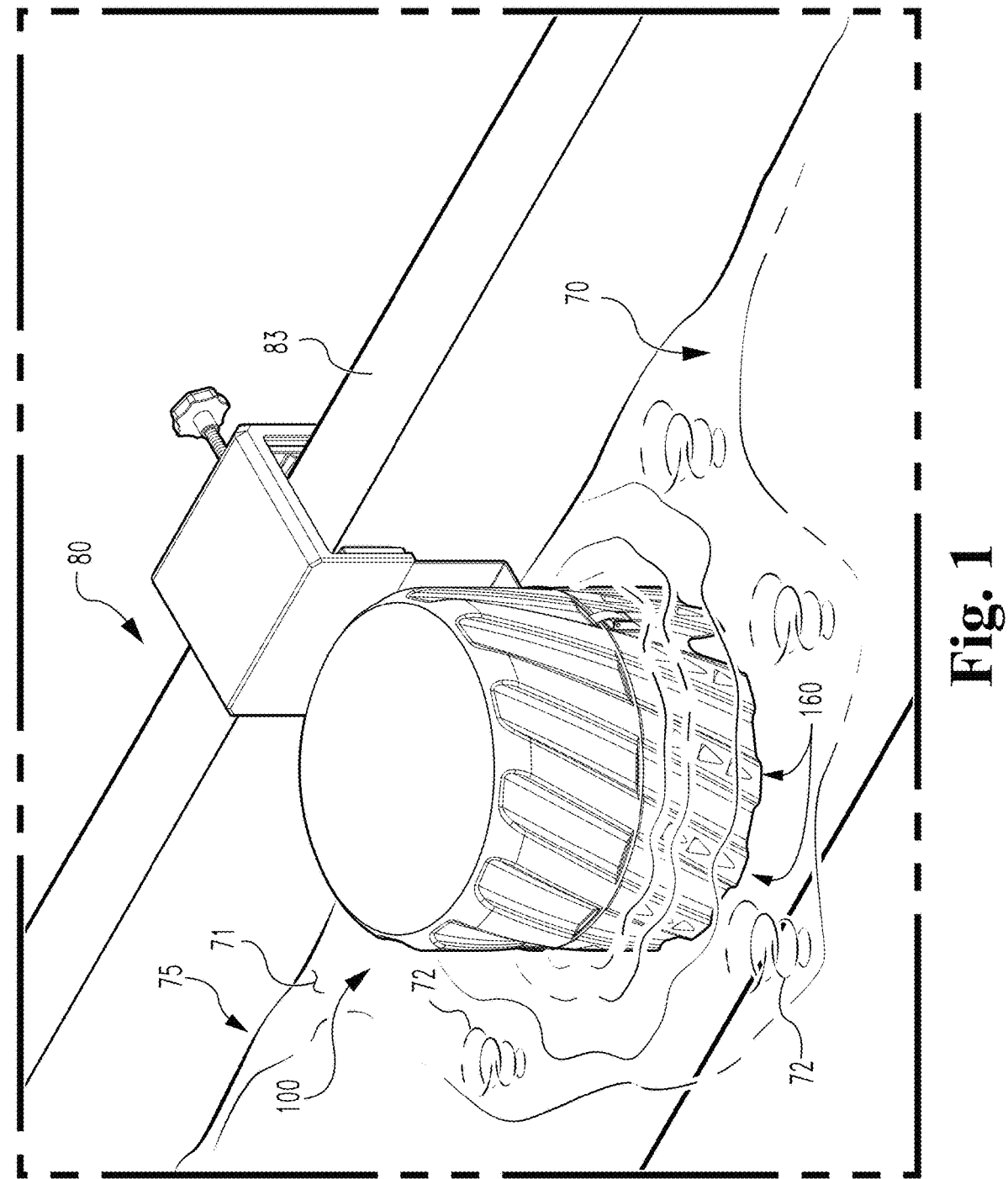
FIG. 1 is a perspective illustration of a water circulation device according to certain embodiments installed to a livestock watering reservoir and generating eddy currents therein.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

With reference to FIG. 1, illustrated therein is a water reservoir 80 having installed thereto a water circulation device 100 according to certain embodiments. While other forms of water reservoir are contemplated, in the illustrated embodiment, the reservoir 80 is a livestock watering reservoir. The reservoir 80 includes a wall 82 having a rim 83, and is at least partially filled with water 70. The water 70 has a water surface 71 defining a water level 75 within the reservoir 80. During use of the water circulation device 100, the device 100 is mounted to the wall 82 and is at least partially submerged in the water 70.

As described herein, the water circulation device 100 includes one or more eddy generators 160 configured to generate eddy currents 72 in the water 70 outside of the water circulation device 100, which aids in discouraging the formation of ice within the reservoir 80. In certain forms, the water circulation device 100 may be connected to an underground water source that supplies the device 100 with relatively warm water regardless of the season, which may further aid in discouraging formation of ice within the reservoir. As described herein, at least some embodiments of the water circulation device 100 are able to discourage the formation of ice without the use of a heating element.

Figure 2:
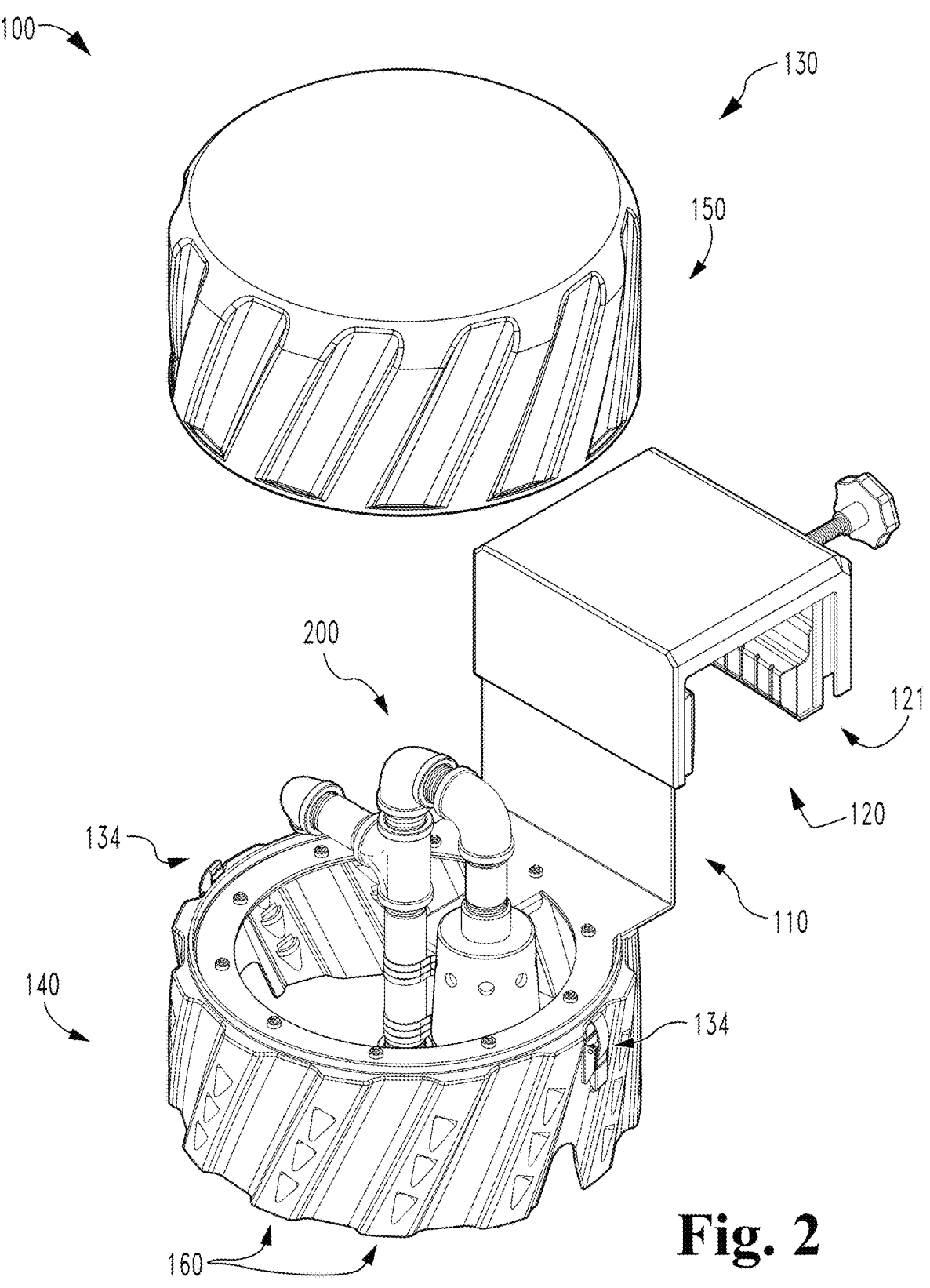
FIG. 2 is an exploded assembly view of the water circulation device, which includes a mounting portion, a housing, and a distribution mechanism.

With additional reference to FIG. 2, the illustrated water circulation device 100 generally includes a frame 110, a mount 120 configured to facilitate installation of the water circulation device 100 to the reservoir 80, and a housing 130 mounted to the frame 110. The housing 130 generally includes a shell 140 and a cover 150 operable to cooperate with the shell 140 to thereby define a chamber 132 of the housing 130. While other forms are contemplated, in the illustrated embodiment, the housing 130 includes and/or defines the eddy generators 160.

Figure 3:
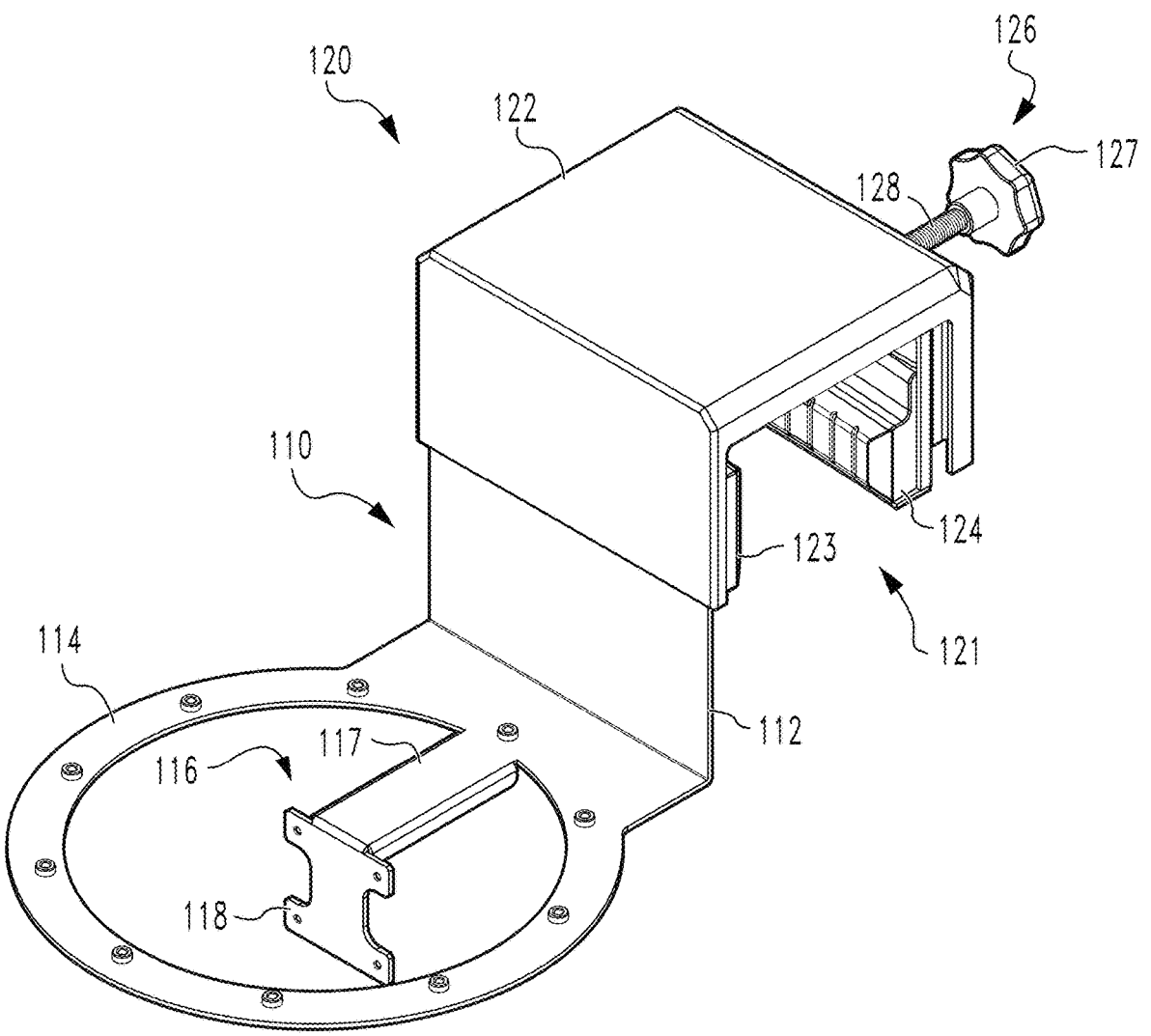
FIG. 3 is a perspective illustration of the mounting portion.

With additional reference to FIG. 3, the frame 110 generally includes a vertically-oriented base 112, a mounting ring 114 projecting from the base 112, and a armature 116 that projects into the mounting ring 114. The armature 116 includes a horizontal arm 117 and a vertically-oriented plate 118. As described herein, the housing 130 is mounted to the ring 114, and the distribution mechanism 200 is coupled to the armature 116.

The mount 120 is configured to facilitate mounting of the water circulation device 100 in the reservoir 80, and in the illustrated embodiment is provided in the form of a clamp 121. The clamp 121 includes a fixed portion 122 including a fixed wall 123, a movable wall 124 mounted for reciprocal movement relative to the fixed wall 123, and an adjustment device 126 operable to adjust the position of the movable wall 124 relative to the fixed wall 123. While other forms are contemplated, in the illustrated form, the adjustment device 126 comprises a knob 127 operable to rotate a screw shaft 128 such that rotation of the knob 127 in opposite directions moves the movable wall 124 toward and away from the fixed wall 123 to thereby facilitate clamping to the rim 83 of the wall 82.

As noted above, the housing 130 generally includes a shell 140 and a cover 150 operable to cooperate with the shell 140 to thereby define the chamber 132. The housing 130 also includes a releasable attachment mechanism 134 operable to selectively retain the housing 130 in a closed condition (FIG. 1) in which the shell 140 and the cover 150 are coupled to one another. Release of the releasable attachment mechanism 134 permits removal of the cover 150 to thereby transition the housing 130 to an open condition (FIG. 2). As described herein, the housing 130 also includes one or more eddy generators 160 configured to generate eddy currents 72 in the water 70 during operation of the device 100.

Figure 4:
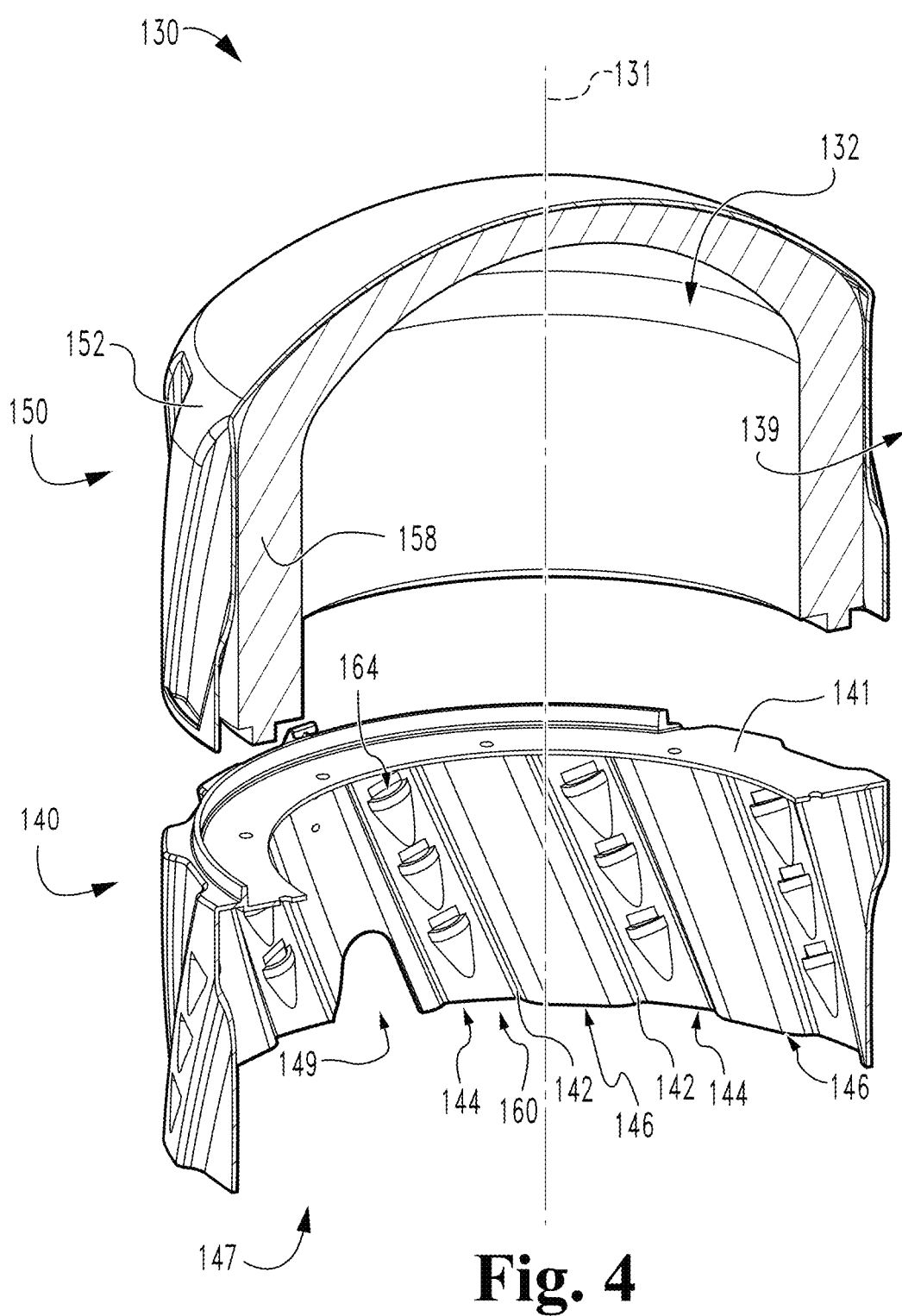
FIG. 4 is an exploded assembly view of the housing.

With additional reference to FIG. 4, the shell 140 is generally annular about a vertically-oriented longitudinal axis 131 of the housing 130. The shell 140 includes a rim 141 configured to facilitate coupling of the shell 140 with the mounting ring 114 (e.g., via fasteners and/or adhesive), and has an open bottom 147. While the shell 140 is generally annular, the shell 140 includes a series of radially-extending helical walls 142. The helical walls 142 cooperate to define helical channels 144 that are separated from one another by helical ridges 146. When viewed from a location within the chamber 132, the helical channels 144 are concave and the helical ridges 146 are convex. Stated another way, the channels 144 project radially outward and generally away from the longitudinal axis 131, while the ridges 146 project radially inward and generally toward the longitudinal axis 131. The shell 140 also includes a plurality of apertures 162, each of which is positioned within a corresponding channel 144. As noted above, the circulation device 100 also includes one or more eddy generators 160. As described herein, each eddy generator 160 comprises a helical channel 144 and one or more apertures 162, and may further include one or more scallops 164. In certain embodiments, the shell 140 may include a recess 149 configured to facilitate extension of a conduit between the chamber 132 and the exterior 139 of the housing 130.

The cover 150 is at least selectively coupled to the shell 140, for example via the releasable attachment mechanism 134. The cover 150 includes a case 152, and is insulated with an insulative lining 158 positioned within the case 152. In the illustrated form, the case 152 includes a series of helical channels and helical ridges that are visually similar to those of the shell 140 such that the shell 140 and the cover 150 have a similar visual appearance. It is also contemplated that the cover 150 may not necessarily include the helical channels and ridges. The insulative lining 158 is intended to shield the chamber 132 from the elements, particularly low temperatures, and may, for example, be formed of EVA foam (e.g., closed cell ethylene-vinyl acetate copolymer foam).

As described herein, during operation of the device 100 in low temperatures, relatively warm water (e.g., from underground) may be discharged into the chamber 132 via the distribution mechanism 200, and the insulative lining 158 may aid in retaining heat energy within the housing 130 to discourage freezing of water and components within the chamber 132. The lining 158 thus forms a thermal insulation barrier for the housing 130. As used herein, the term "thermal insulation barrier" indicates that the lining 158 is formed of a material recognized by those skilled in the art to be an effective thermal insulator. Such materials can include, for example, EVA foam, Styrofoam, fiberglass, mineral wool, cellulose, polystyrene, polyisocyanurate, polyurethane, perlite, cementitious foam, phenolic foam, and others.

Figure 5:
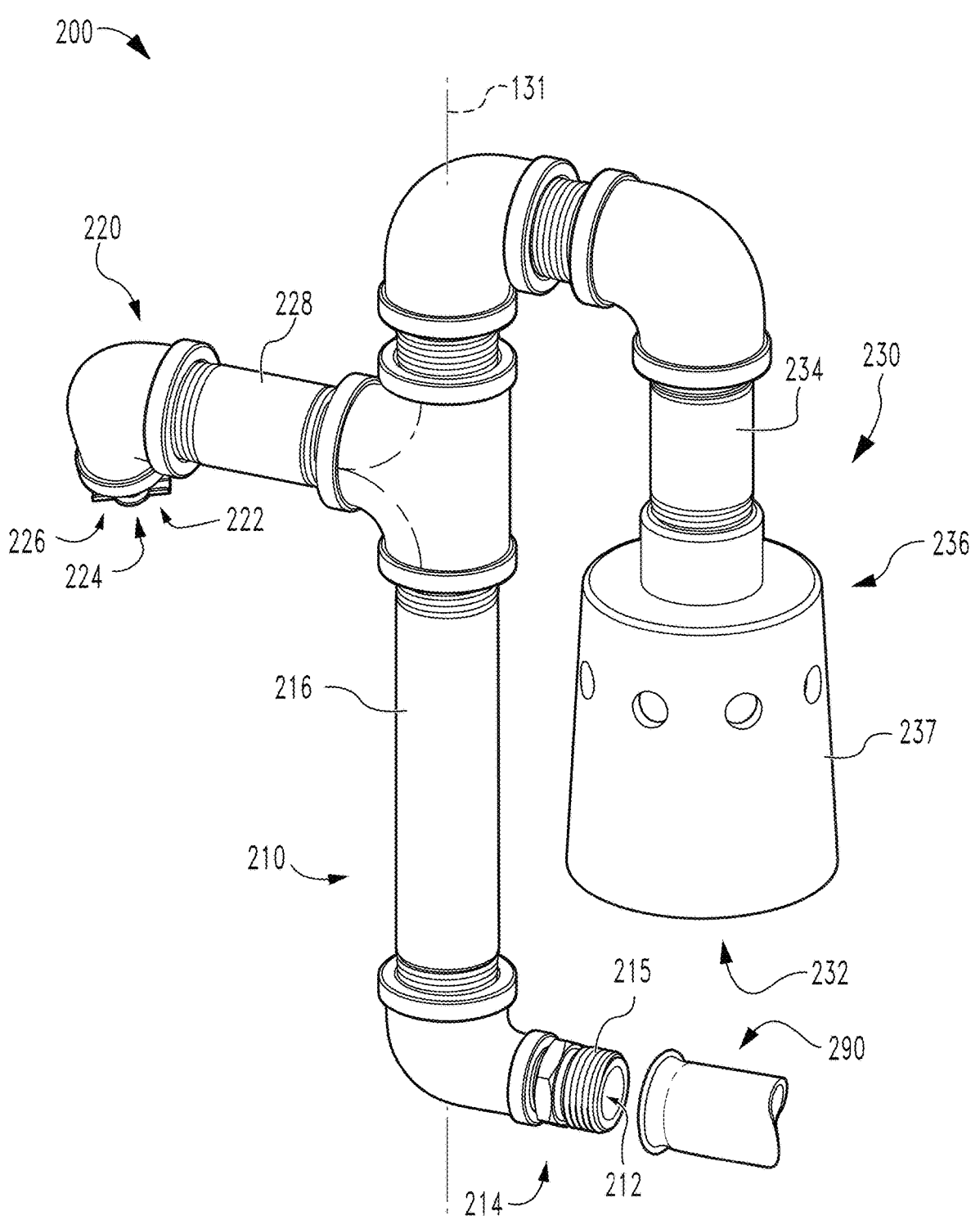
FIG. 5 is a perspective view of the distribution mechanism.
Figure 6:
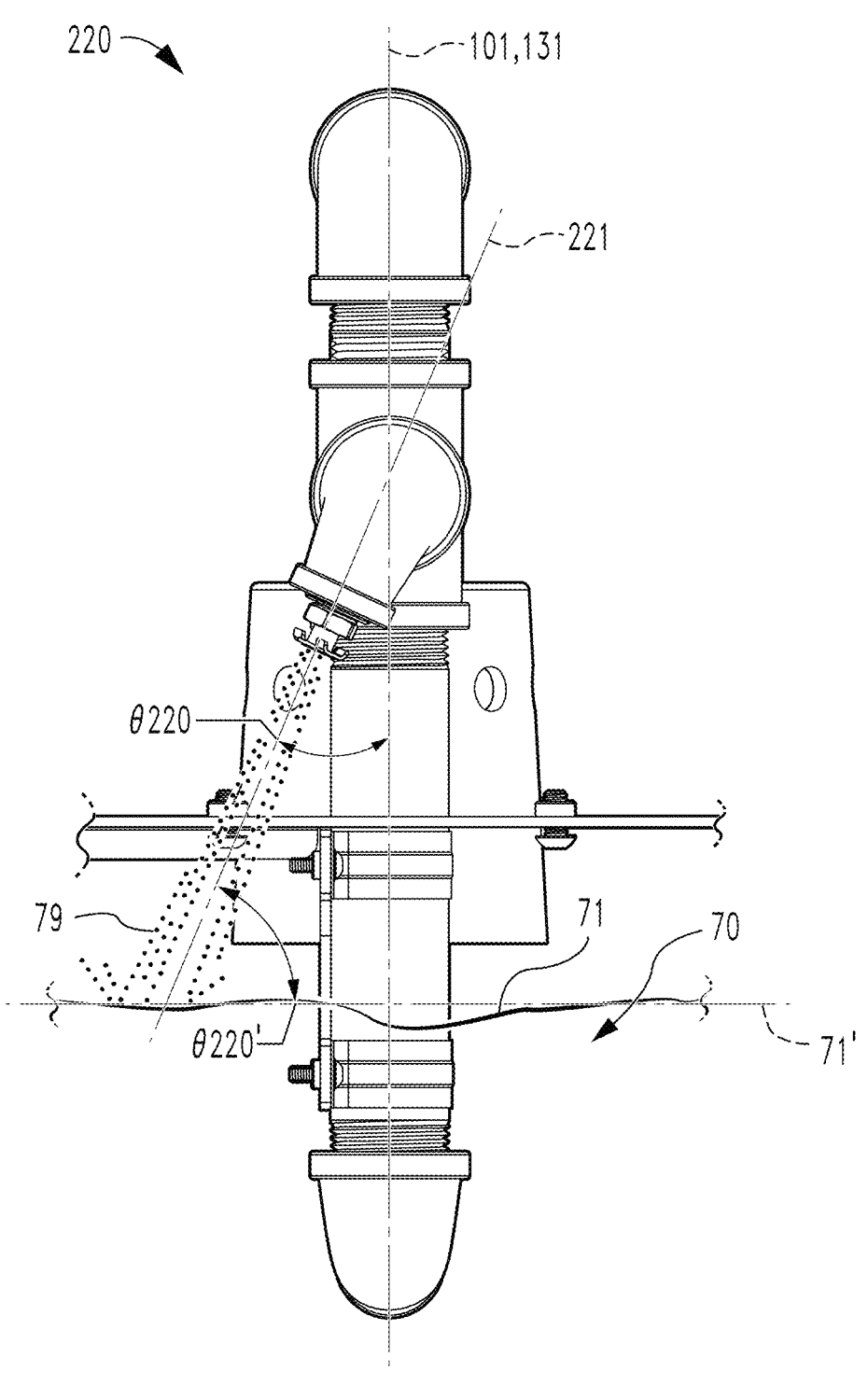
FIG. 6 is a side elevational view of the distribution mechanism partially submerged in water.

With additional reference to FIGS. 5 and 6, the distribution mechanism 200 generally includes an inlet portion 210 and a first outlet portion 220, and may further include a second outlet portion 230. As described herein, the inlet portion 210 is configured for connection to a water source (e.g., an underground water source), and each of the outlet portions 220, 230 is configured to at least selectively discharge water that is received via the inlet portion 210 to the chamber 132 of the housing 130.

The inlet portion 210 includes an inlet 212, which in the illustrated form is provided at an end of a horizontally-extending pipe 214. The pipe 214 may include threading 215 to facilitate connection of the inlet 212 to a conduit 290, such as a hose. A vertical main pipe 216 extends from the pipe 214 toward the outlet portions 220, 230. While the illustrated main pipe 216 extends generally along the longitudinal axis 131 of the housing 130, it should be appreciated that the main pipe 216 may extend along another axis. The main pipe 216 may facilitate coupling of the distribution mechanism 200 to the frame 110. For example, U-shaped brackets 202 may be utilized to couple the main pipe 216 to the vertical plate 118 of the armature 116. The inlet portion 210 may be aligned with the recess 149 to thereby facilitate the passage of the conduit 290 between the interior chamber 132 and the exterior 139 of the housing 130.

The first outlet portion 220 generally includes a first outlet 222, which in the illustrated form is provided by a nozzle 224. As described herein, the illustrated nozzle 224 defines an oblique angle relative to the longitudinal axis 231 and/or the water surface 71, and is radially offset from the longitudinal axis 231 (e.g., by a connector 228) such that water discharged from the nozzle 224 creates a swirling motion within the shell 140. In certain embodiments, the first outlet portion 220 may include a valve 226 operable to modulate and/or stop the flow of water via the nozzle 224. For example, the valve 226 may be provided in the form of a stopcock valve. In certain forms, the nozzle 224 may be considered to include the valve 226 and/or the valve 226 may be considered to include the nozzle 224.

The first outlet portion 220 is configured to discharge a water stream 79 in a discharge direction 221 that extends along the nozzle 224. In the illustrated form, the nozzle 224 (and thus the discharge direction 221) defines a first non-zero angle θ220 relative to a vertically-extending axis 101, which in the illustration of FIG. 6 is the longitudinal axis 131 of the housing 130 along which the main pipe 216 extends. Stated another way, the discharge direction 221 of the illustrated embodiment is non-parallel with the vertical axis 101. The discharge direction 221 also defines an angle θ220' relative to a horizontal plane 71' corresponding to the surface 71 of the water 70. Those skilled in the art will readily recognize because the vertical axis 131 and the horizontal plane 71' are orthogonal, the angles θ220, 0220' are nominally complementary. The skilled artisan will further recognize that the angles θ220, 0220' may not be truly complementary. For example, the line defined by the stream 79 may not be straight, such as due to air resistance, gravity, and/or other factors.

In the illustrated form, the non-zero angle θ220 is an oblique angle of about 30°. In certain embodiments, the angle θ220 may take other values, such as a value between 15° and 45°, or between 20° and 40°. It is also contemplated that the angle θ220 may be a right angle, for example in embodiments in which the nozzle 224 is horizontal. However, it may be preferred for the angle θ220 to be an oblique angle to impart on the discharged water a downward velocity component, which may aid in the generation of the eddy currents 72 and/or increase the stability or robustness of the eddy currents 72.

The second outlet portion 230 includes a second outlet 232, which in the illustrated form is provided via a vertically-extending discharge pipe 234. In the illustrated form, the discharge pipe 234 is provided with a float valve 236 configured to selectively permit flow out of the second outlet

232. The float valve 236 includes a float 237, and is configured to selectively permit flow of water based on the vertical position of the float 237. When the water level 75 within the reservoir 80 is below a threshold height, the float 237 will permit the flow of water via the outlet 232 to thereby raise the water level 75 in the reservoir 80. When the water level 75 reaches the threshold height, the float 237 closes the outlet 232 to thereby prevent further flow of water and discourage overflowing of the reservoir 80. In certain embodiments, the distribution mechanism 200 may be configured to provide a greater volumetric flow rate via the second outlet 232 than via the first outlet 222. In certain embodiments, the distribution mechanism 200 may be configured to provide a greater flow velocity via the first outlet 222 than via the second outlet 232.

Figure 7:
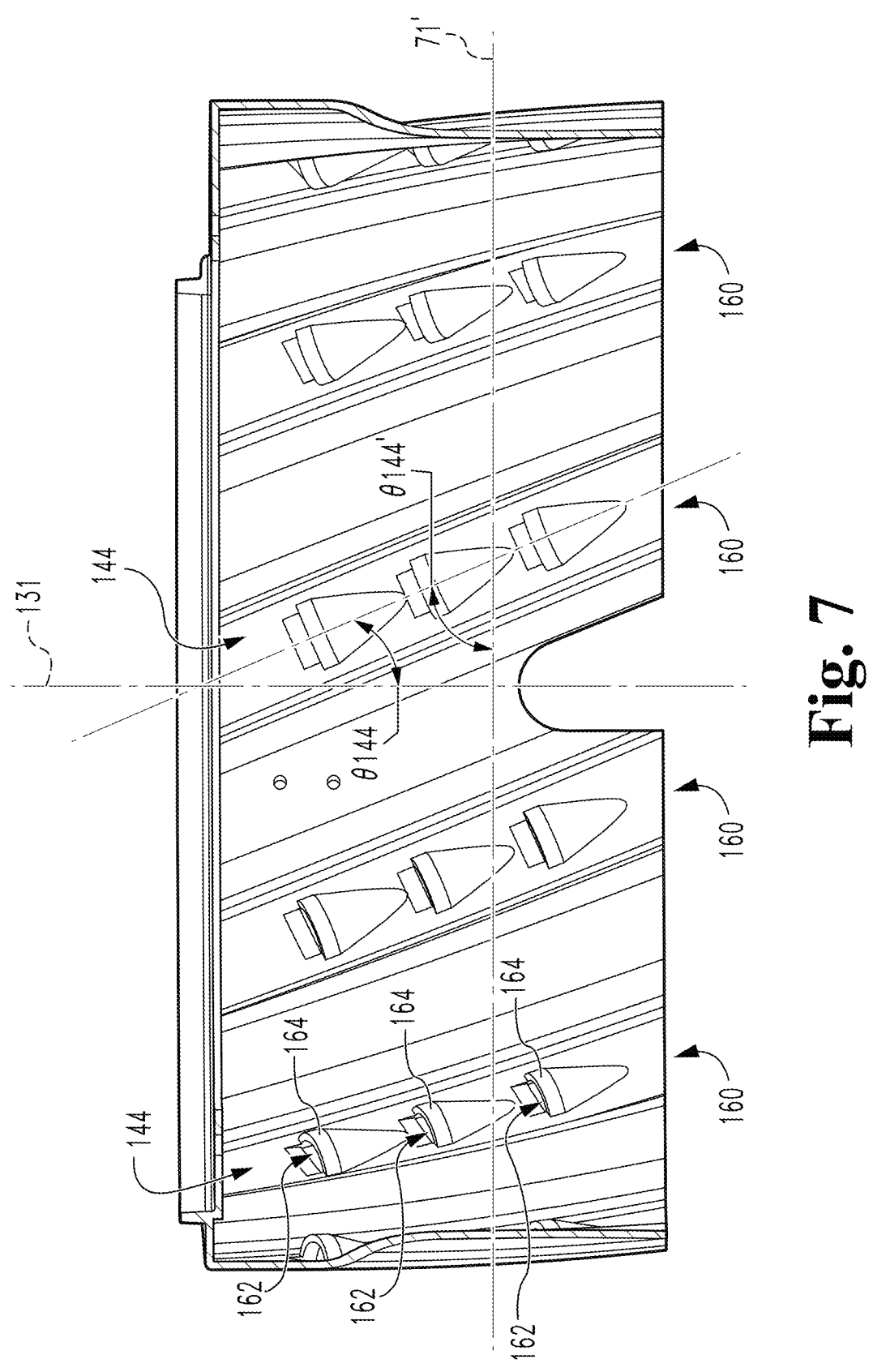
FIG. 7 is a cross-sectional illustration of a shell of the housing.

With additional reference to FIG. 7, as noted above, the water circulation device 100 includes one or more eddy generators 160 configured to generate eddy currents 72 in the water 70 that is within the reservoir 80 and outside of the housing 130. In the illustrated form, each eddy generator 160 includes one or more apertures 162, and may further include at least one scallop 164 that at least partially defines the one or more apertures 162. In certain forms, the eddy generator 160 may be further considered to include one or more of the helical channels 144, and the one or more apertures 162 may be positioned in the corresponding helical channel 144. While other forms are contemplated, in the illustrated form, the scallops 164 project radially inward and thereby urge water flowing along the channel 144 to exit the shell 140 in a manner that generates swirling eddy currents 72. The scallops 164 may be tapered to further encourage such generation of eddy currents 72.

The helical channels 144 may define a first oblique angle θ144 relative to the vertical housing axis 131 and a second oblique angle θ144' relative to the horizontal plane 71' corresponding to the water surface 71. While other forms are contemplated, in the illustrated form, the oblique angle θ144 for the helical channels 144 corresponds to the oblique angle θ220 for the discharge direction 221.

Figure 8:
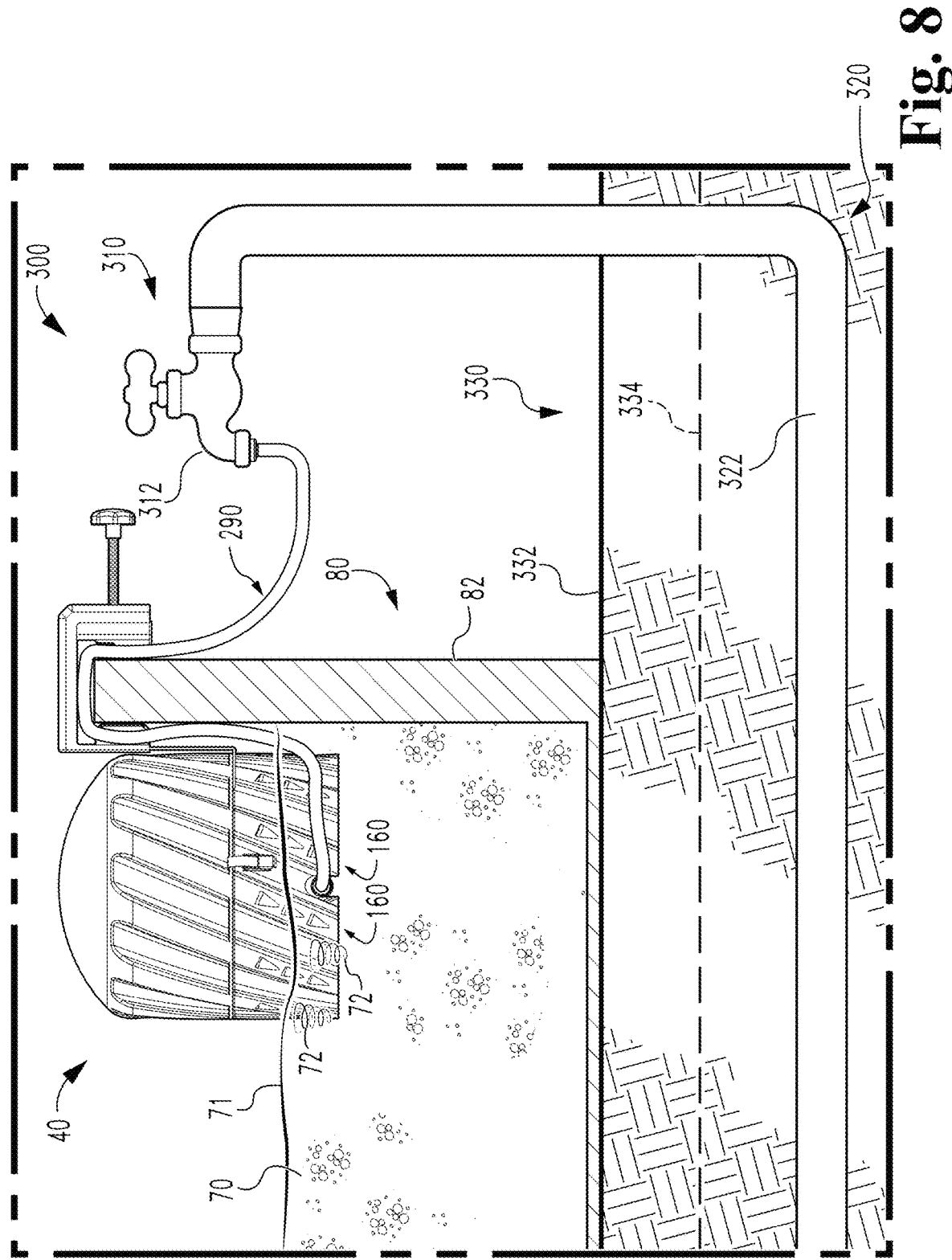
FIG. 8 is a schematic cross-sectional view of a system according to certain embodiments.

With additional reference to FIG. 8, illustrated therein is a system 300 according to certain embodiments. The system 300 generally includes the reservoir 80 in which water 70 is held, the water circulation device 100, a conduit 290, and a water source 310 operable to provide water from an underground water supply 320 that is buried in earth 330. In the illustrated form, the water source 310 includes a spigot 312, which is fluidically connected with the inlet portion 210 of the distribution mechanism 200 via the conduit 290. For example, the conduit 290 may be provided in the form of a hose having opposite ends that are threadedly engaged with corresponding threads of the distribution mechanism 200 and spigot 312.

As noted above, the illustrated system 300 utilizes an underground water supply 320. As used herein, the term "underground water supply" indicates that water is stored below ground level 332 and/or passes through underground piping 322 prior to delivery to the water circulation device. As such, the term "underground water supply" may be used to refer to well water, groundwater, and/or water stored in a below-ground reservoir. In certain forms, municipal water may be considered to constitute an underground water supply, for example when the pipes 322 conveying the water to the water source 310 are buried in earth 330. Preferably, the underground portion of the underground water supply 320 is positioned at least partially below the frost line 334 such that the water provided by the underground water supply 320 has a relatively constant temperature regardless of the season.

Those skilled in the art will readily appreciate that in most areas of the United States, the frost line 334 is three to five feet below the ground surface 332, and temperatures of earth 330 below the frost line 334 generally stay in the range of about 40° F. to about 50° F. Thus, water provided by an underground water supply 320 in winter months may be significantly warmer than the water 70 already in the reservoir 80, which may have been chilled by the cold air to which it is exposed. As described herein, the use of relatively warm water (e.g., from an underground water supply 320) may provide certain advantages to the use of the device 100. Additionally, while other water supplies may be utilized, municipal water may be advantageous in that it is pressurized such that the water can be directed to the circulation device 100 without the use of electricity, for example by simply opening the spigot 312 after connecting the spigot 312 to the distribution mechanism 200 via the conduit 290.

Figure 9:
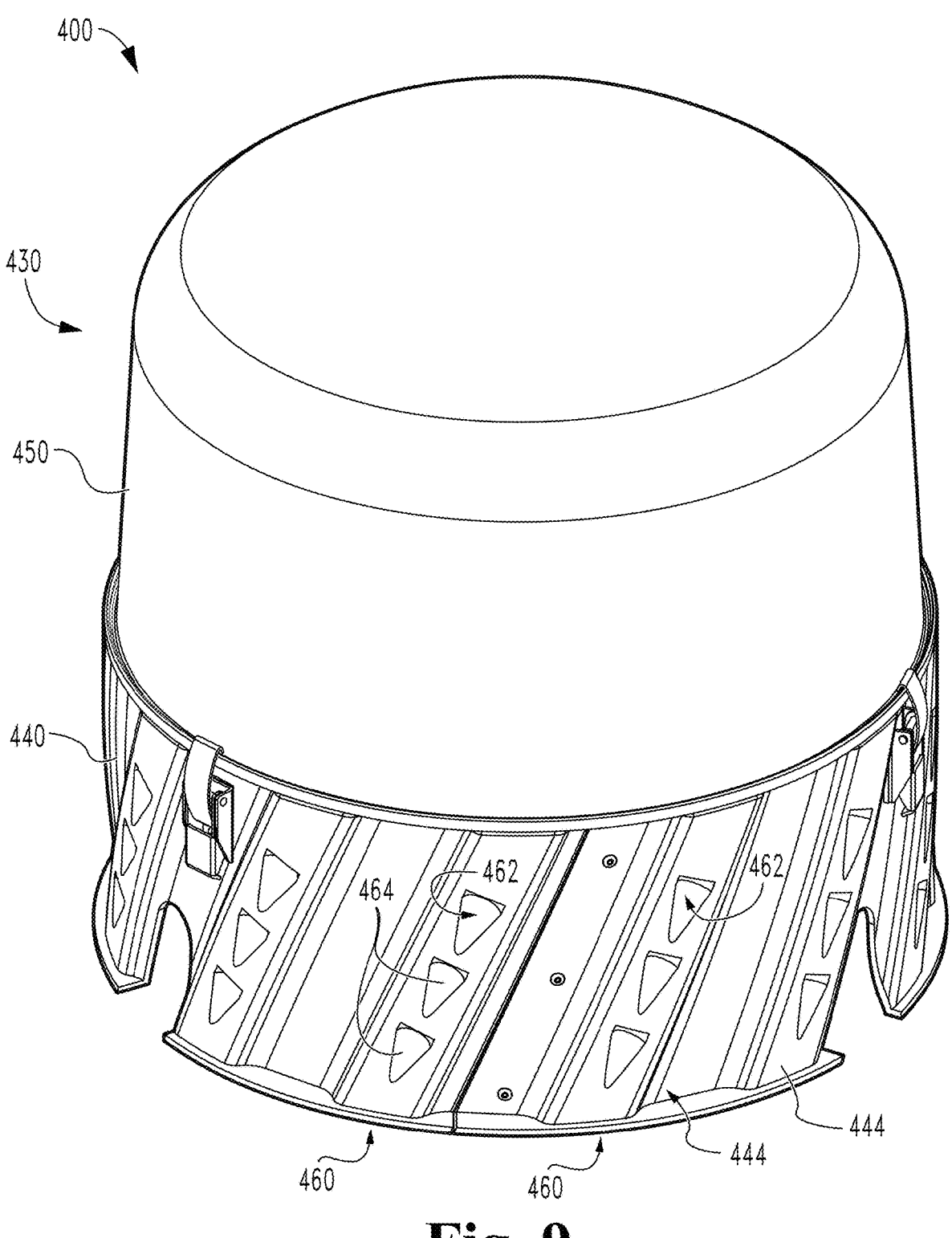
FIG. 9 is a perspective illustration of a water circulation device according to certain embodiments.
Figure 10:
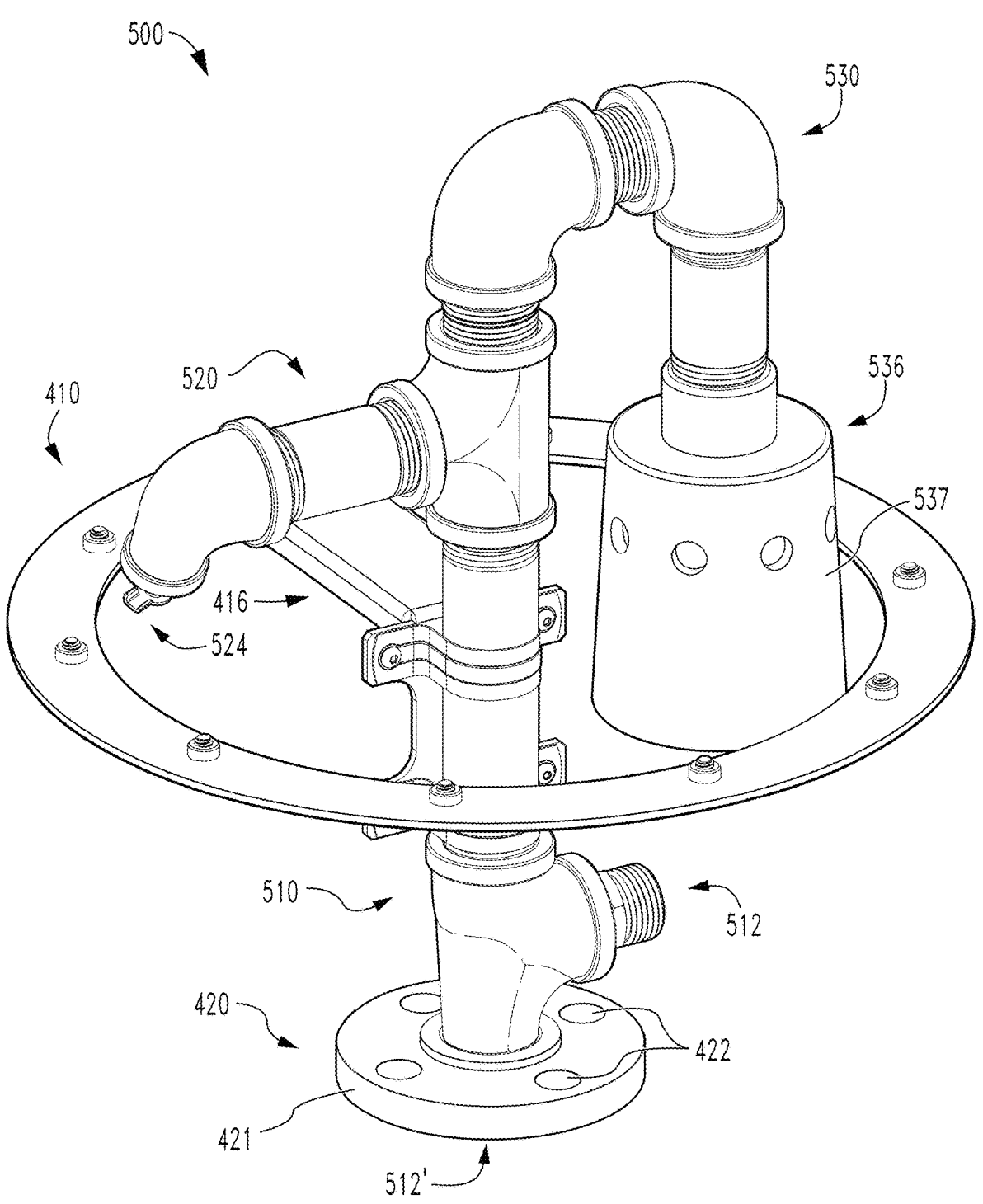
FIG. 10 is a perspective illustration of a distribution mechanism according to certain embodiments.

With additional reference to FIGS. 9 and 10, illustrated therein are a water circulation device 400 according to certain embodiments. The water circulation device 400 is substantially similar to the water circulation device 100 illustrated in FIGS. 1-8, and generally includes a frame 410, a mount 420 configured to facilitate installation of the water circulation device 400 to the reservoir 80, a housing 430 including a shell 440 and a cover 450 and defining one or more eddy generators 460, and a distribution mechanism 500 that is mounted to the frame 410 within the housing 430. The frame 410, housing 430, shell 440, cover 450, eddy generators 460, and distribution mechanism 500 are substantially similar to the frame 110, housing 130, shell 140, cover 150, eddy generators 160, and distribution mechanism 200 described above with reference to the circulation device 100, and similar reference characters are used to denote similar elements and features. For example, the illustrated distribution mechanism 500 generally includes an inlet portion 510, a first outlet portion 520, and a second outlet portion 530, which respectively correspond to the inlet portion 210, first outlet portion 220, and second outlet portion 230 described above. In the interest of conciseness, the following description of the water circulation device 400 focuses primarily on elements and features that are different from those described with reference to the water circulation device 100.

As with the inlet portion 210 of the distribution mechanism 200, the inlet portion 510 of the current embodiment includes an inlet 512 in fluid communication with the outlet portions 520, 530. The current distribution mechanism 500, however, can include an additional or alternative inlet 512' in fluid communication with the outlet portions 520, 530. While the illustrated inlet portion 510 includes two inlets 512, 512', it is also contemplated that the inlet portion 510 may include only one of the inlet 512 or the inlet 512'. As described herein, each of the inlets 512, 512' is operable to be connected to a corresponding water supply to thereby direct water to the outlet portions 520, 530.

In the illustrated embodiment, the mount 420 is not provided in the form of a clamp 121, but is instead provided in the form of a mounting plate 421 that is disposed about the inlet 512'. Because the clamp 121 is omitted in the illustrated form, the frame 410 is provided as a generally annular frame 410 into which an armature 416 projects. The mounting plate 421 includes one or more apertures 422 that may facilitate attachment of the water circulation device 400 to a standpipe 84 of the reservoir 80, as illustrated in FIG.

11. While other forms are contemplated, in the illustrated embodiment, the mount 420 is threaded onto a lower end of the inlet portion 210.

Figure 11:
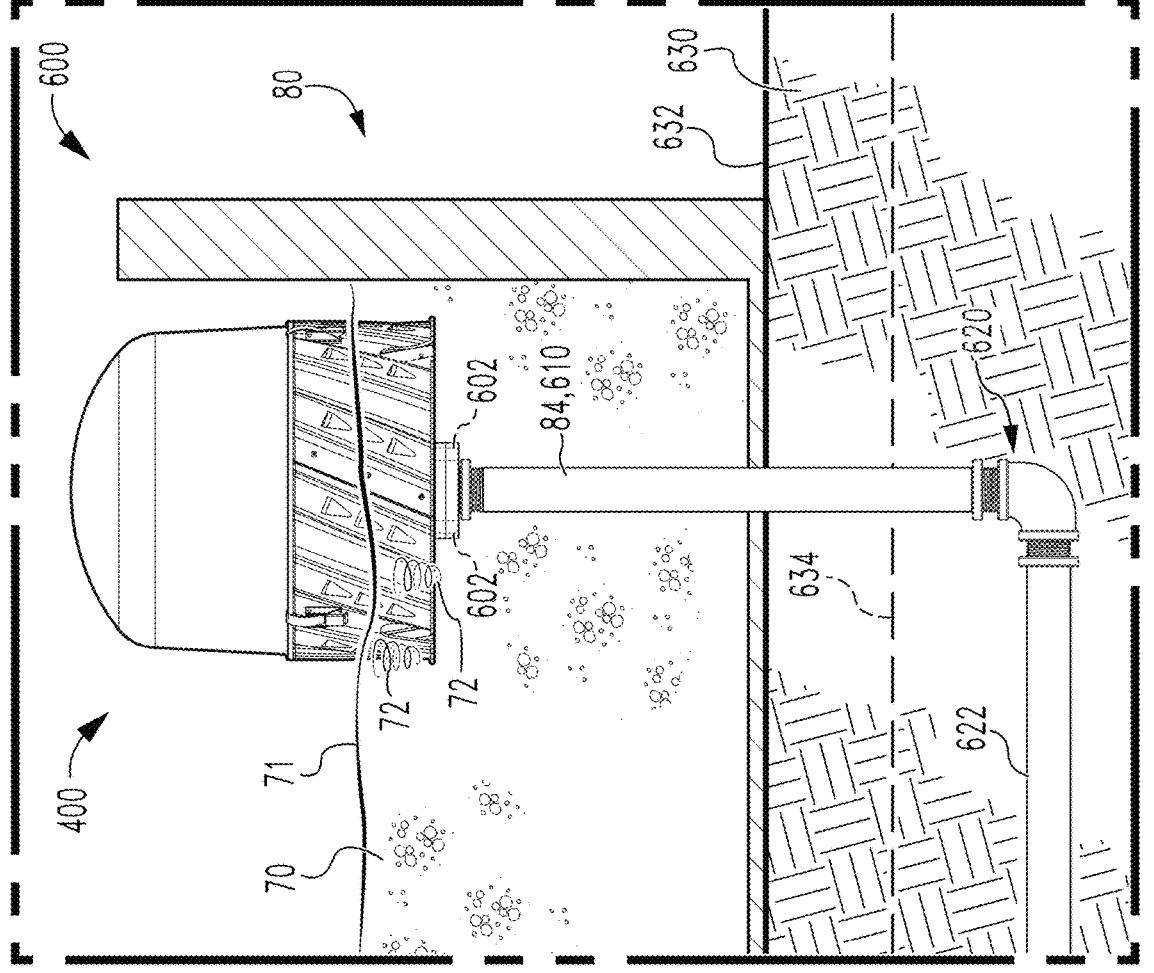
FIG. 11 is a schematic cross-sectional view of a system according to certain embodiments.

With additional reference to FIG. 11, illustrated therein is a system 600 according to certain embodiments. The system 600 generally includes the reservoir 80 in which water 70 is held, the water circulation device 400, and a water source 610 operable to provide water from an underground water supply 620 that is buried in earth 630. In the illustrated form, the water source 610 is provided in the form of a standpipe 84 that extends through the bottom of the reservoir 80 to the underground water supply 620, and the device 400 is coupled to the standpipe 84 via fasteners 602 such that the distribution mechanism 500 is operable to receive water from the standpipe 84 via the inlet 512'. It is also contemplated that the water source 610 may take another form. As one example, the standpipe 84 may not necessarily be directly connected with the underground water supply 620, but may instead be connected with the water supply 620 via a spigot such as the spigot 312. As another example, the standpipe 84 may not necessarily be connected to a water supply 620, and may instead merely be provided for mounting purposes. In such forms, the distribution mechanism 500 may be fluidically coupled with the water supply 620 in another manner, such as via a conduit that connects the inlet 512 to the supply 620.

It should be evident from the foregoing that the water circulation device 400 is operable to be connected with a water supply 620 in either of two ways. More particularly, the device 400 can be connected with a water supply 620 by placing the inlet 512 in fluid communication with the water supply 620 via a conduit (for example as described above with reference to the conduit 290), and can additionally or alternatively be connected with the water supply 620 by placing the inlet 512' in fluid communication with the water supply 620 via a standpipe 84. In certain forms, the inlet 512, 512' that is not in use may be closed with a stopper (e.g., a cap or plug) to prevent water from exiting via the unused inlet 512, 512'. Additionally or as an alternative, the inlets 512, 512' may be provided with one-way check valves that permit inflow of water via the corresponding inlet 512, 512' but prevent outflow of water via the corresponding inlet 512, 512'.

Figure 12:
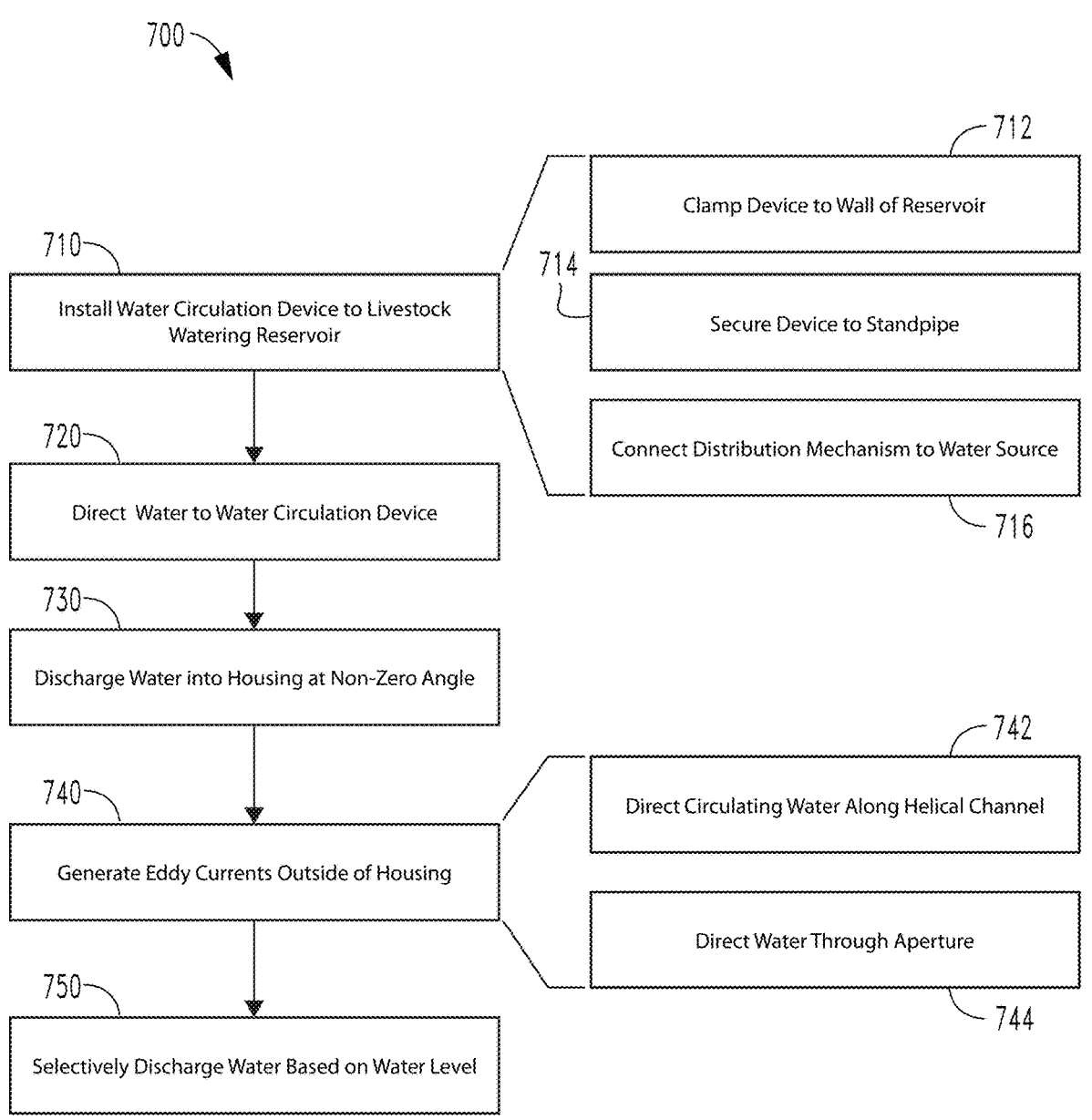
FIG. 12 is a schematic flow diagram of a process according to certain embodiments.

With additional reference to FIG. 12, illustrated therein is an exemplary process 700 that may be performed using the system 300 and/or the system 600. Blocks illustrated for the processes in the present application are understood to be examples only, and blocks may be combined or divided, and added or removed, as well as re-ordered in whole or in part, unless explicitly stated to the contrary. While the blocks are illustrated in a relatively serial fashion, it is to be understood that two or more of the blocks may be performed concurrently or in parallel with one another. Additionally, while the process 700 is described herein with specific reference to the water circulation devices 100, 400 and corresponding systems 300, 600 illustrated in FIGS. 1-11, it is to be appreciated that the process 700 may be performed with water circulation devices and/or systems having additional and/or alternative features.

The process 700 generally involves discouraging freezing in a livestock watering reservoir using a water circulation device including a nozzle and an annular shell including apertures and helical channels. For example, the process 700 may involve discouraging freezing in the livestock watering reservoir 80 using the water circulation device 100, which generally includes a nozzle 224 and an annular shell 140 including apertures 162 and helical channels 144. Similarly, the process 700 may involve discouraging freezing in the livestock watering reservoir 80 using the water circulation device 400, which generally includes a nozzle 524 and an annular shell 440 including apertures 462 and helical channels 444.

The process 700 may include block 710, which generally involves installing the water circulation device to the livestock watering reservoir. For example, block 710 may involve installing the water circulation device 100 and/or the water circulation device 400 to the livestock watering reservoir 80.

In certain forms, block 710 includes block 712, which generally involves clamping the device to a wall of the reservoir. For example, in embodiments in which the water circulation device is provided along the lines of the device 100, block 712 may involve operating the clamp 121 to thereby clamp the device 100 to the wall 82 of the reservoir 80.

In certain forms, block 710 includes block 714, which generally involves securing the device to a standpipe of the reservoir. For example, in embodiments in which the water circulation device is provided along the lines of the device 400, block 714 may involve securing the mounting plate 421 to the standpipe 84 with fasteners 602 to thereby provide the device 400 with a fixed location within the reservoir 80.

Block 710 may additionally or alternatively include block 716, which generally involves connecting a distribution mechanism of the circulation device to a water supply. For example, block 714 may involve connecting the distribution mechanism 200 to the water source 310 by attaching a conduit 290 between the inlet portion 210 and the spigot 312. It should be appreciated that in certain forms, block 716 may not necessarily require additional steps. For example, in embodiments in which the device 400 is mounted to an active standpipe 84 in block 714, the installer may not need to perform additional steps to connect the distribution mechanism 500 to the water supply 620 since the inlet 512' has already been placed in fluid communication with the water supply 620.

The process 700 may include block 720, which generally involve directing water to the water circulation device. As one example for the system 300, block 720 may involve operating the spigot 312 of the water source 310 to thereby conduct water to the distribution mechanism 200 via the conduit 290. As one example for the system 600, block 720 may involve operating a spigot to thereby conduct water to the distribution mechanism 500 via the standpipe 84.

In certain embodiments, block 720 may involve directing water from an underground water source to the water circulation device. In certain forms, block 720 may be performed without the use of electricity and/or fuel (e.g., without the use of electricity and without the use of fuel). As one example, the water source 310/610 may be in fluid communication with a pressurized underground water supply 320/620 in the form of municipal piping 322/622, and the directing of block 720 may involve utilizing the pressure of the municipal water supply to charge the water from the water source 310/610 to the distribution device 100/400. In other forms, block 720 may involve the use of electricity and/or fuel. For example, block 720 may involve operating an electricity- or fuel-powered pump to pump the water from an underground water supply, such as a well, or another water supply, such as a lake, pond, or river.

The process 700 may include block 730, which generally involves discharging water from a nozzle into the housing at a non-zero angle relative to a vertical axis. For example, block 730 may involve discharging a stream 79 of water from the nozzle 224/424 into the housing 130/430 at a non-zero angle θ220 relative to a vertical axis 131. In certain forms, the non-zero angle θ220 may be a right angle such that the water stream 79 is discharged parallel to a horizontal plane 71' corresponding to the surface 71 of the water 70. As noted above, however, in certain embodiments it may be preferred to provide the discharged water with a velocity having a downward component. In such forms, the non-zero angle θ220 may be an oblique angle. Regardless of the precise angle utilized, block 730 may nonetheless result in circulation of water within the shell 140/440.

The process 700 may include block 740, which generally involves generating eddy currents outside the housing. Block 740 may, for example, involve generating eddy currents 72 outside the housing 130/430 using one or more eddy generators 160/460. An eddy generator 160/460 may include a helical channel 144/444 and an aperture 162/462, and may further include a scallop 164/464 adjacent the aperture 162/462.

Block 740 may include block 742, which generally involves directing circulating water along a helical channel. For example, block 742 may involve directing circulating water within the shell 140/440 along the helical channel 144/444. Due to several factors, such as the generally annular geometry of the shell 140/440, the helical nature of the channels 144/444, and the direction of the channels 144/444 corresponding to the circulating direction of the discharged water 79, the directing of block 742 results in swirling water traveling generally downward along the channel 144/444 toward the aperture 162/462.

Block 740 may include block 744, which generally involves directing water through an aperture, which may be positioned in a channel. For example, block 744 may involve directing water out of the housing 140/440 via the apertures 162/462, which may be positioned in the channels 144/444. In certain embodiments, the aperture 162/462 may be adjacent to and/or defined in part by a scallop 164/464. In such forms, block 740 may involve causing the scallop 164/464 to direct circulating water within the annular shell 140/440 outward from the annular shell 140/440 via the aperture 162/462.

It should be appreciated that the generation of eddy currents 72 in block 740 can aid in discouraging freezing in the reservoir 80. Indeed, those skilled in the art will readily appreciate that still water is more easily frozen than moving water, and that forcing such eddy currents 72 along the surface 71 of the water 70 in the reservoir 80 discourages the formation of ice. Moreover, in embodiments in which the discharged water 79 is of a higher temperature than the stored water 70, the discharged water 79 that forms the eddy currents must not only be stilled, but also chilled before freezing. Moreover, there is a synergy in generating the eddy currents 72 with relatively warm water (e.g., water from an underground water supply 320).

The process 700 may include block 750, which generally involves selectively discharging water based on a water level within the housing. For example, block 750 may involve selectively discharging water 79 to the livestock watering reservoir 80 based upon a level of water 70 within the housing 130. By way of illustration, block 750 may involve operating the float valve 236/536 to discharge water from the second outlet portion 320/520 based upon the position of the float 237/537, which generally corresponds to the level of water within the housing 140/440.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A water circulation device configured for mounting within a livestock watering reservoir, the water circulation device comprising:

a mount configured to facilitate mounting of the water circulation device within the livestock watering reservoir;

a housing coupled to the mount, wherein the housing extends along a longitudinal axis, and wherein the housing comprises a plurality of helical channels and a plurality of apertures distributed amongst the plurality of helical channels; and a nozzle mounted in the housing, the nozzle configured to discharge water at an oblique angle relative to the longitudinal axis to thereby cause circulation of water within the housing;

wherein the housing is configured to discharge circulating water via the plurality of apertures in a manner that generates eddy currents in an area of the livestock watering reservoir that is positioned outside of the housing.

2. The water circulation device of claim 1, wherein a discharge direction of the discharged water corresponds to a direction in which the helical channels wrap about the housing.

3. The water circulation device of claim 1, wherein the housing comprises:

an annular shell having an open bottom, the annular shell comprising the helical channels and the apertures; and a cover releasably coupled to the annular shell, the cover comprising a thermal insulation barrier.

4. The water circulation device of claim 1, wherein the nozzle is radially offset from the longitudinal axis.

5. The water circulation device of claim 1, further comprising a float valve configured to selectively discharge additional water into the housing based upon a current level of water in the housing.

6. The water circulation device of claim 1, wherein each aperture is defined at least in part by a corresponding scallop.

7. The water circulation device of claim 1, wherein the water circulation device lacks a heating element.

8. A water circulation device configured for mounting within a livestock watering reservoir, the water circulation device comprising:

an annular shell comprising an eddy generator; and a nozzle configured to discharge water into the annular shell at an oblique angle to thereby cause the water to circulate within the annular shell;

wherein the eddy generator comprises an aperture and a helical channel configured to direct water circulating within the annular shell out of the aperture to thereby generate an eddy current outside the annular shell.

9. The water circulation device of claim 8, further comprising a mount configured to facilitate mounting of the water circulation device within the livestock watering reservoir.

10. The water circulation device of claim 8, wherein the annular shell comprises a plurality of additional eddy generators.

11. The water circulation device of claim 8, further comprising an insulated cap removably coupled with the annular shell to thereby form a housing in which the nozzle is positioned.

12. The water circulation device of claim 8, wherein the annular shell is annular about a longitudinal axis; and wherein the nozzle is radially offset from the longitudinal axis.

13. The water circulation device of claim 8, further comprising:

a discharge port operable to discharge water into the annular shell; and a float configured to selectively prevent flow of water through the discharge port.

14. The water circulation device of claim 8, wherein the aperture is defined at least in part by a scallop.

15. The water circulation device of claim 14, wherein the scallop is tapered.

16. A method of discouraging freezing in a livestock watering reservoir, the method comprising:

mounting the water circulation device of claim 8 within the livestock watering reservoir;

discharging water from the nozzle into the annular shell at the oblique angle, thereby causing circulation of water within the shell, wherein the oblique angle is defined relative to a vertical axis; and generating eddy currents within an area of the livestock watering reservoir that is outside of the annular shell, wherein generating the eddy currents comprises directing circulating water within the annular shell along the helical channel to thereby cause water to exit the annular shell via the aperture of the annular shell.

17. The method of claim 16, wherein generating the eddy currents comprises causing a scallop adjacent the aperture to direct circulating water within the annular shell outward from the annular shell via the aperture.

18. The method of claim 16, further comprising directing water from an underground water supply to the nozzle.

19. The method of claim 16, wherein the method is performed without use of electricity.

20. The method of claim 16, wherein the method is performed without use of fuel.

21. The method of claim 16, wherein the oblique angle is at least 15°.

22. The method of claim 16, wherein the livestock watering reservoir holds water; and wherein the annular shell is partially submerged in the water such that a water surface of the water is positioned within the annular shell and struck by water discharged from the nozzle.

23. The method of claim 16, wherein the vertical axis is orthogonal to a horizontal plane corresponding to a level of water within the livestock watering reservoir.

24. The method of claim 16, further comprising selectively discharging water to the livestock watering reservoir based upon a level of water within the housing.

\* \* \* \* \*